UNITED STATES PATENT OFFICE.

TORANOSKE NISHIGAWA, OF TOKYO, JAPAN.

PROCESS OF MANUFACTURING SODA.

1,359,097.

Specification of Letters Patent.

Patented Nov. 16, 1920.

No Drawing.

Application filed September 30, 1919. Serial No. 327,574.

*To all whom it may concern:*

Be it known that I, TORANOSKE NISHIGAWA, subject of Japan, residing at No. 5, Hikawa Cho, Akasaka Ku, Tokyo, Japan, have invented new and useful Improvements in Processes of Manufacturing Soda, of which the following is a specification.

This invention relates to improvements in a process of manufacturing soda and consists in first obtaining sodium bicarbonate by passing ammonia and carbon dioxid into a solution of sodium chlorid; then in adding sodium chlorid to the remaining liquor and causing the ammonium chlorid contained therein to crystallize and precipitate by cooling the said remaining liquor while passing thereinto sufficient ammonia to transform the small amount of sodium and ammonium bicarbonates into normal carbonates, the ammonia used being obtained by fixing the nitrogen contained in the waste gases issuing from the carbonators and scrubbers. The object of this invention is to manufacture soda economically by transforming all the sodium chlorid, which according to processes hitherto known, is being thrown away, into sodium bicarbonate and by utilizing at the same time the nitrogen contained in the waste gases.

According to the ammonia-soda process as hitherto practised, of which the present invention is an improvement, a saturated solution of sodium chlorid is caused to absorb ammonia gas into which is passed carbon dioxid (containing nitrogen) issuing from the lime kiln, and sodium bicarbonate is thus formed. The reaction which takes place is as follows:—

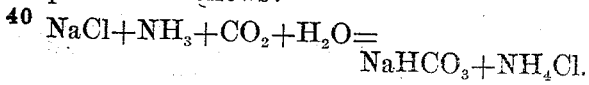

The sodium bicarbonate thus produced is filtered off by a filter, and from the mother liquor which contains small proportions of sodium and ammonium bicarbonates and large proportions of sodium and ammonium chlorids, ammonia is recovered but sodium and calcium chlorids are entirely thrown away. Thus, nearly one half of the sodium chlorid, together with calcium chlorid and more or less sodium bicarbonate is lost, and the process cannot be commercially worked unless at places where salt can be very cheaply obtained.

According to my invention, in order to utilize the sodium chlorid contained in the mother liquor after filtering off sodium bicarbonate in the above process, further sodium chlorid is added thereto, and ammonium chlorid is separated therefrom by cooling the liquor and passing thereinto ammonia, which is obtained, not by distilling the mother liquor, but from gases issuing from the carbonators and scrubbers by fixing the nitrogen contained therein, as it is found there is an almost pure state. All of the sodium chlorid remaining unconverted in the mother liquor, returning to the absorber after the addition to the liquor of sodium chlorid, which is chemically equivalent to the sodium bicarbonate formed, is not lost and is eventually converted into soda, while the ammonia is transformed into ammonium chlorid, which is collected as a by-product. In this way, the ammonia-soda process can be worked most economically, and the following is an example of carrying my invention into practice.

Separate sodium bicarbonate formed by passing ammonia and carbon dioxid into a solution of sodium chlorid, as in the process hitherto practised. To the remaining mother liquor add sodium chlorid chemically equivalent to the sodium bicarbonate filtered off, and cool the liquor to below 5° C. by any suitable refrigerating machine, adding thereto sufficient ammonia to turn a small proportion of bicarbonates remaining dissolved in the liquor into normal carbonates. The reaction in the carbonators being

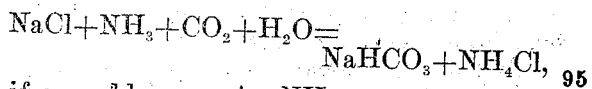

if we add ammonia, $NH_3$, to the product, the reaction will be

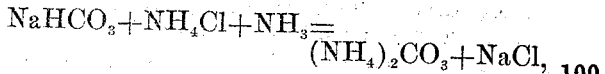

thus decomposing the carbonates and ammonium chlorid, and at the same time, the greater part of the ammonium chlorid which exists in a large proportion, will crystallize and precipitate, and is filtered off. In other words, in the common ammonia soda process, carbon dioxid is added to sodium chlorid solution under pressure while the solution is being cooled, in such a ratio as to produce bicarbonate, that is, primary carbonate, and the reaction which takes place is:—

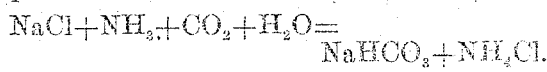
$$NaCl + NH_3 + CO_2 + H_2O = NaHCO_3 + NH_4Cl.$$

Now, if ammonia be added to bicarbonate, cooling the latter, but not under pressure, the bicarbonates, or primary carbonate, will become secondary carbonate, and the balance with ammonium chlorid will be broken, and double decomposition will take place as follows:—

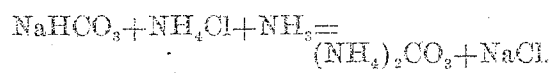
$$NaHCO_3 + NH_4Cl + NH_3 = (NH_4)_2CO_3 + NaCl.$$

In this way the sodium bicarbonate of the mother liquor will be decomposed and sodium chlorid and ammonium secondary carbonate will be formed.

The liquor which remains after filtering off ammonium chlorid is a strong salt water containing a small proportion of ammonium chlorid, and is available as brine in the manufacture of sodium bicarbonate.

The gas issuing from the carbonators and scrubbers while manufacturing sodium bicarbonate by passing ammonia gas and the carbon dioxid which comes out of lime kiln and contains nitrogen, into a solution of sodium chlorid, being almost pure nitrogen, is passed over heated calcium carbid and converted into calcium cyanamid from which ammonia is obtained by heating the same in water under a high pressure, or by mixing the nitrogen with a proper proportion of hydrogen it is converted into ammonia using a catalyzer, and the ammonia thus obtained is used in the process of manufacturing sodium bicarbonate.

In short, the main features of this invention consist in adding sodium chlorid to the mother liquor after sodium bicarbonate has been filtered off therefrom; and in causing reaction just reverse to that which has taken place in the main process. By adding $NH_3$ the bicarbonate is converted into monocarbonate (secondary carbonate). It is only between the ammonia bicarbonate and sodium chlorid that double decomposition takes place, forming sodium bicarbonate and ammonium chlorid; therefore as soon as the bicarbonate is converted into monocarbonate (secondary carbonate) the reverse action will set in and already formed ammonium chlorid will give up its ammonium and combine with sodium and reform sodium chlorid, and at the same time ammonium chlorid will crystallize, and the remaining liquid is used in the main process as brine. Thus according to my process, about 40% of sodium chlorid which has hitherto been lost, will be saved, and the lime hitherto required for recovering ammonia will be totally dispensed with, besides saving the chlorin as calcium chlorid lost in the said process of recovering ammonia.

The advantages of this invention are—

1. The sodium chlorid can be repeatedly utilized in the process until it is totally consumed.

2. The chlorin produced by decomposition of sodium chlorid is caused to combine with ammonia and form ammonium chlorid, which is a valuable by-product.

3. Sodium bicarbonate dissolved in the mother liquor which is usually lost in the process of recovering ammonia by means of lime and steam in the ammonia still, is converted into sodium chlorid and ammonium carbonate, both of which remain in the mother liquor after precipitation of ammonium chlorid and is returned to the absorber to form ammoniacal brine.

4. Nitrogen contained in the waste gases is utilized to produce ammonia and is used in the main process.

5. The work and expenses of distilling ammonia from the mother liquor by adding lime thereto and heating, can be dispensed with, and consequently loss of ammonia is prevented.

In short, according to my invention, nothing is unnecessarily lost, and the ammonia-soda process can be worked most economically.

Claims:

1. The process of precipitating sodium bicarbonate by passing ammonia and carbonic acid into solution of sodium chlorid, which consists in adding to the mother liquor sodium chlorid, after sodium bicarbonate has been filtered therefrom; in cooling the said mother liquor while passing thereinto sufficient ammonia to convert the bicarbonates remaining dissolved therein to normal carbonates, thus causing ammonium chlorid to crystallize and precipitate; and in using the remaining mother liquor as brine for the production of sodium bicarbonate, substantially as hereinbefore set forth.

2. The process of precipitating sodium bicarbonate by passing ammonia and carbonic acid into solution of sodium chlorid, which consists in adding to the mother liquor sodium chlorid, after sodium bicarbonate has been filtered therefrom; in cooling the said mother liquor to below 5° centigrade while passing thereinto sufficient ammonia to convert the bicarbonates remaining dissolved therein to normal carbonates, thus causing ammonium chlorid to crystallize and precipitate; and in using the remaining mother liquor as brine for the production of sodium bicarbonate, substantially as hereinbefore set forth.

3. The process of precipitating sodium bicarbonate by passing ammonia and carbonic acid into solution of sodium chlorid which consists in adding to the mother liquor sodium chlorid after sodium bicarbonate has been filtered therefrom; in cooling the said mother liquor while passing thereinto sufficient ammonia to convert the bicarbonates remaining dissolved therein to normal carbonates; in using the remaining mother liquor as brine for the production of sodium bicarbonate; and in fixing the nitrogen gas issuing from the carbonators, using the ammonia thus obtained in the production of sodium bicarbonate according to the improved process, substantially as hereinbefore set forth.

In testimony whereof I have signed my name to this specification.

TORANOSKE NISHIGAWA.